Oct. 19, 1965  E. M. HYDE  3,212,673
BATCH MEASURING APPARATUS
Filed Nov. 21, 1962  4 Sheets-Sheet 1

INVENTOR
EDWARD M. HYDE
BY Howson & Howson
ATTYS.

Oct. 19, 1965      E. M. HYDE      3,212,673

BATCH MEASURING APPARATUS

Filed Nov. 21, 1962      4 Sheets-Sheet 2

INVENTOR
EDWARD M. HYDE
BY Howson & Howson
ATTYS.

Oct. 19, 1965    E. M. HYDE    3,212,673
BATCH MEASURING APPARATUS
Filed Nov. 21, 1962    4 Sheets-Sheet 3

INVENTOR
EDWARD M. HYDE
BY Howson & Howson
ATTYS.

Oct. 19, 1965    E. M. HYDE    3,212,673

BATCH MEASURING APPARATUS

Filed Nov. 21, 1962    4 Sheets-Sheet 4

INVENTOR:
EDWARD M. HYDE
BY Howson & Howson
ATTYS.

United States Patent Office 3,212,673
Patented Oct. 19, 1965

3,212,673
BATCH MEASURING APPARATUS
Edward M. Hyde, Lafayette Hill, Pa., assignor to Proctor & Schwartz, Inc., Philadelphia, Pa., a corporation of Pennsylvania
Filed Nov. 21, 1962, Ser. No. 239,300
24 Claims. (Cl. 222—59)

This invention relates to batch measuring apparatus and has for an object the provision of improvements in this art.

In certain respects this invention is an improvement upon the apparatus disclosed in my copending application Serial Number 103,794, filed April 18, 1961, now abandoned and the measuring or weighing apparatus disclosed therein will be taken as the basic form to which the present improvement is applied.

In the copending application referred to, there are a plurality of supply units which deposit weighed batches of textile fiber stock serially upon a moving conveyor belt with the aim of providing a plurality of continuous superposed layers of fiber stock on the belt as it travels along at constant speed.

Obviously, in order for each supply unit to provide a continuous uninterrupted layer upon the conveyor belt as it travels at a constant speed, the supply unit must dump a batch of fiber stock material on the belt in each unit of time that the belt has moved forward through a distance equal to the length of the batch of material which is deposited.

In the apparatus disclosed in the copending application it is arranged that each supply unit will make ready a given amount of material within a time which is less than the full unit of time required for the belt to move a batch-length or unit distance so that all batches may be dumped at once upon the belt at the end of a unit of time.

Because of various factors which cannot easily be controlled, the supply units may provide variable amounts of material within a unit of time. In the copending application this difficulty is recognized and provision made for alleviating it in the form of hand adjusting means for the speed of supply of material at a supply unit together with mens providing a warning signal at the end of a unit of time or period at any supply unit which has not provided the full predetermined amount of material, the operator then responding to the warning signal by adjusting the rate of feed of the indicated malfunctioning supply unit.

However, the manual feed adjusting means requires the constant attention of an operator and usually entails the temporary stoppage of the conveyor belt to allow the delinquent supply unit to provide the predetermined amount of material.

According to the present invention means are provided for automatically adjusting the feed of a unit if at a given check period, less than the full unit of time or given operating period, the exact predetermined amount of material has not been provided.

The invention will best be understood from the following description of an exemplary embodiment, reference being made to the accompanying drawings, wherein.

Figure 1:
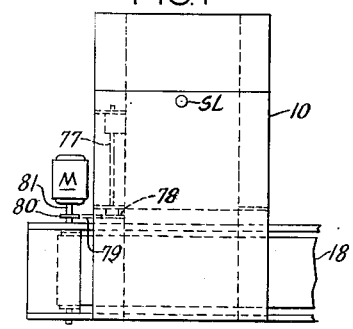
FIG. 1 is a top plan view of a supply unit embodying the present invention.
Figure 2:
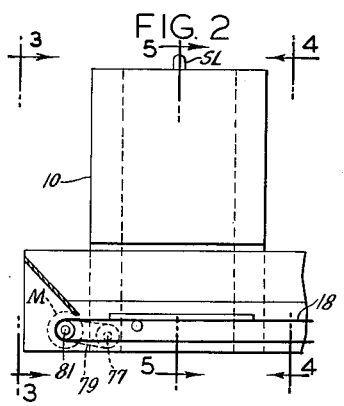
FIG. 2 is a front elevation of the apparatus shown in FIG. 1.

Referring to the drawings, the batch feeding unit illustrated includes a supply bin 10 having a horizontal feed conveyor belt 11 for moving material, here assumed to be fiber stock, to an inclined spike apron feed conveyor 12 which feeds the material upward. An evening doffer 13 is provided in the bin 10 near the upper end of the spike apron 12 to remove fiber stock standing above a given height on the apron and return it to the bin.

The fiber stock left on the apron moves over the top turn with the apron and begins a descent on the other side to be weighed and discharged. A take-off doffer 14 removes fiber stock from the downwardly moving spike apron and moves it to the weighing mechanism therebelow.

The fiber stock removed from the apron by the doffer 14 falls down between two hinged over-run catching trap doors 15 which stand open during the filling cycle until a predetermined weight of material has been fed down to the weighing device. A material holding hopper 16 directs the fiber stock down upon a pair of scale pan trap doors 17 which are hinged at their outer edges to swing downward at the center.

After being weighed, the fiber stock is discharged to any suitable off-take means, such for example as the conveyor belt 18 driven by a motor M at constant speed. The conveyor belt in the copending application was used to provide a constantly moving table for the deposit of superposed layers of material from a plurality of supply units for blending purposes; herein it is representative of any demand device requiring a uniform supply of material and imposing a time-supply demand on the batch weighing unit. The time cycle control could alternatively be provided by a pure timing device such as a constant speed motor for driving the time control cams hereinafter to be described.

Figure 3:
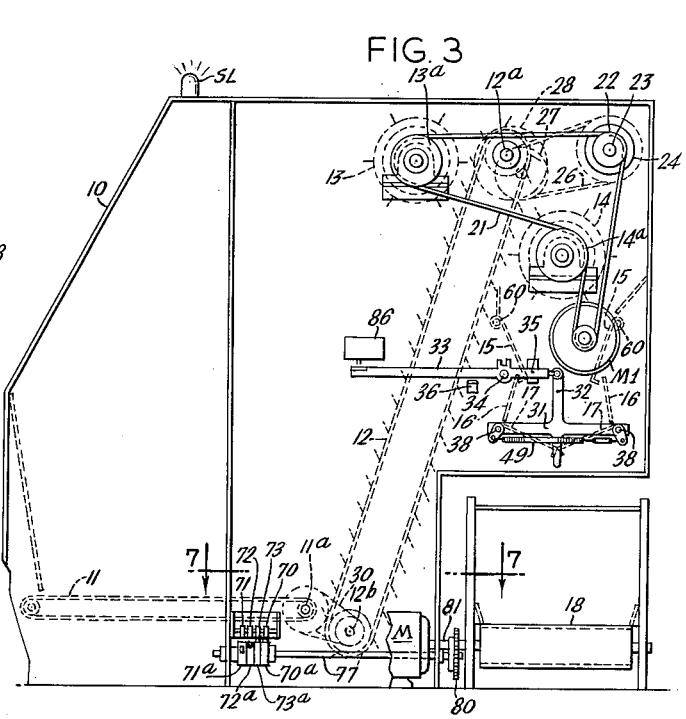
FIG. 3 is an enlarged side elevation taken on the line 3—3 of FIG. 2.

Referring to FIG. 3, an electric motor M1 is provided for driving the spike belt 12 and the doffers 13 and 14. The motor M1 drives through a belt 21 which passes over a pulley 22 of a lay shaft 23, a pulley 13a of the shaft of doffer 13, and over a pulley 14a of the doffer 14.

In order to provide for stopping and starting the operation of the spike apron for each batch of material provided, the lay shaft 23 is provided with an electromagnetic clutch 24 which connects the shaft 23 to or disconnects it from the constantly turning pulley 22, leaving only the doffers to be operated continuously by the motor M1.

Figure 4:
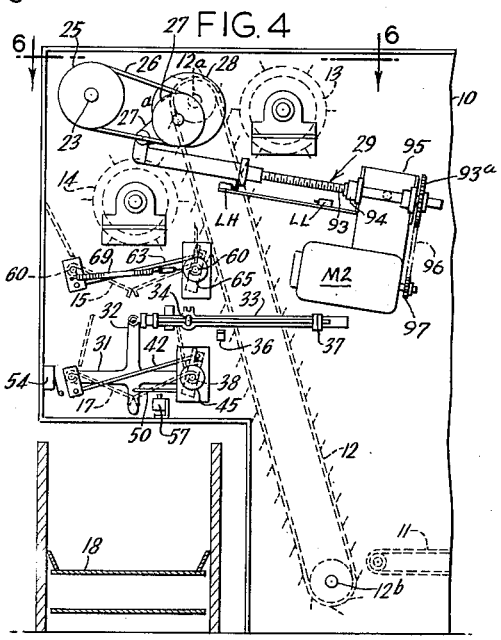
FIG. 4 is an enlarged partial side elevation of the side opposite that shown in FIG. 3, the view being taken on the line 4—4 of FIG. 2.
Figure 5:
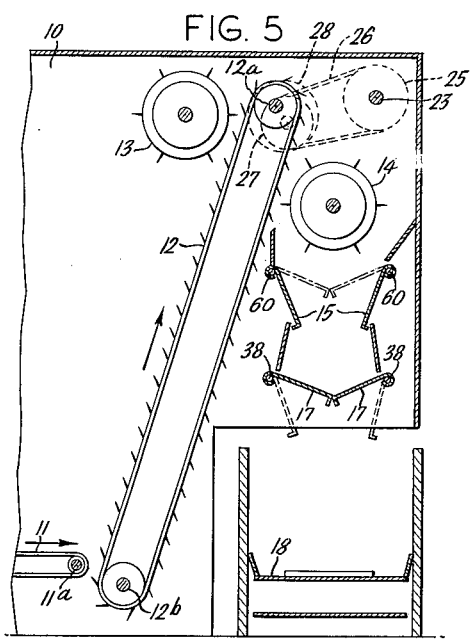
FIG. 5 is an enlarged partial vertical longitudinal section taken on the line 5—5 of FIG. 2.
Figure 6:
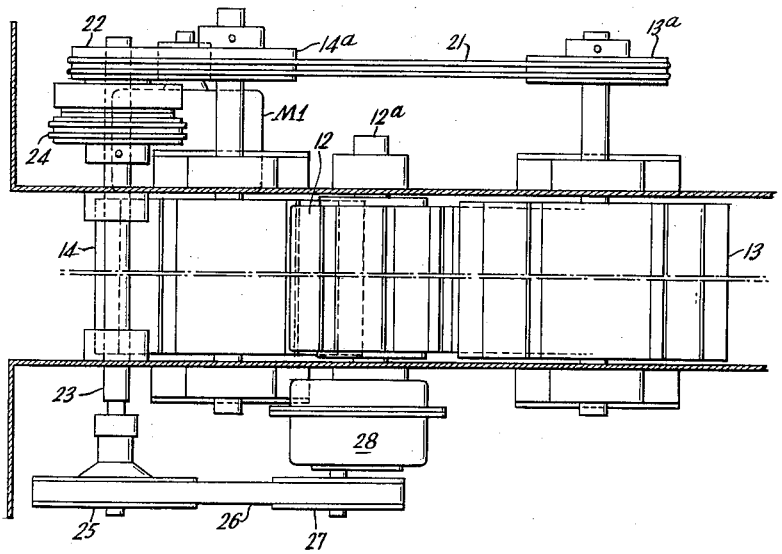
FIG. 6 is an enlarged partial plan and section taken on the line 6—6 of FIG. 4.

As shown in FIG. 4, the other end of the lay shaft 23 on the other side of the machine operates through speed-change mechanism of a modified Reeves belt drive type to drive the upper sprocket shaft 12a of the spike apron 12. Specifically, a split spring-pressed pulley 25 on the shaft 23 drives a V-belt 26 which drives a laterally shiftable pulley 27 of a reduction gear drive 28 for the apron driving shaft 12a. By shifting the position of the pulley 27 about the axis of the apron shaft 12a the distance between the split pulley 25 and the driven pulley 27 is varied and this causes the parts of the split pulley 25 to separate or move together to vary the effective drive diameter for the belt 21 and thereby vary the speed ratio of the drive. This drive arrangement is shown in plan at the top of FIG. 6.

The position of the pulley 27 about the shaft 12a is adjusted by an adjusting device 29 which is a special concern of the present invention and which will be described more at length hereinafter.

As shown in FIG. 3, the sprocket shaft 12b at the lower end of the spike apron drives the bin conveyor belt 11 through its sprocket shaft 11a through a drive chain 30. Thereby the belt 11 moves and stops with the moving and stopping of the spike apron.

As shown in FIG. 3, the scale device on which the pan trap doors 17 are hinged includes end pan frame members 31 suspended by integral arms 32 from scale beams 33. The scale beams 33 are connected by a transverse tie rod 34 and are mounted on fulcrum supports 35 carried by the sides of the frame of the machine, stops 36 being provided for limiting the downward movement of the outer ends of the beams 33. An adjusting weight 37 is provided on one of the beams 33.

Transverse hinge shafts 38 carried by the scale frame members 31 (FIG. 3) support the scale pans or trap doors 17 for turning movement between the upper or closed position and the lower open or dumping position. Means, including a connection link 42, are provided for causing both of the trap doors 17 to move together in unison when the shaft 38 of one of them is operated. The details of this mechanism are not needed for an understanding of the present invention.

A rotary solenoid 45 is provided to operate one of the shafts 38 to close the doors and, since the doors are interconnected, this operates both doors together. A spring 49 (FIG. 3) with suitable tension adjustment counterbalances part of the weight of the doors to lighten the action required of the solenoid. The doors swing down by gravity but are normally latched in closed position by a latch rod 50, the latch rod 50 being moved up to unlatch the doors for dumping by the plunger of a solenoid 57.

The construction and operation of the upper overrun trap doors 15 are similar to that of the scale trap doors 17. The trap doors 15 are mounted on transverse hinge shafts 60, are connected by a link 63, are operated to closed position by a solenoid 65, and are partly weight-balanced by an adjustable spring 69.

Figure 7:
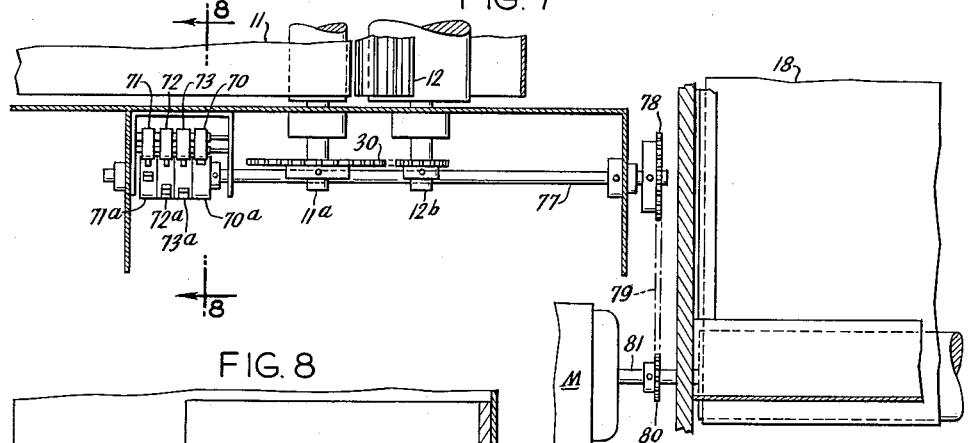
FIG. 7 is an enlarged partial plan and section taken on the line 7—7 of FIG. 3.
Figure 8:
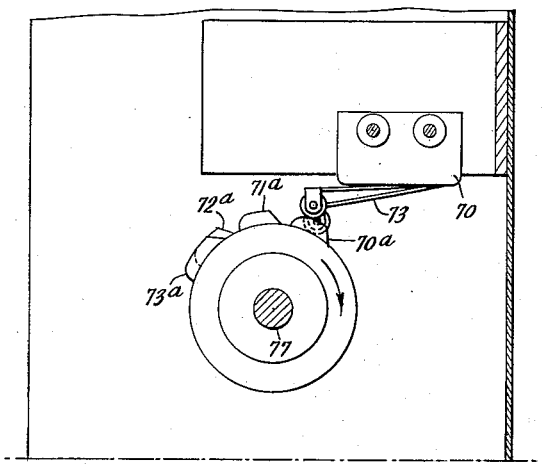
FIG. 8 is an enlarged partial vertical section taken on the line 8—8 of FIG. 7.

The timed cycle functions of the feed unit are controlled in part by means of four switches 70, 71, 72 and 73 (FIG. 7) operated by cams 70a, 71a, 72a, and 73a carried by a cam shaft 77. The shaft 77 has a sprocket 78 driven by a sprocket chain 79 from the sprocket 80 of the drive shaft 81 of the conveyor belt 18 or any other suitable demand or timing means. As shown, the shaft 81 is driven by the motor M.

Figure 9:
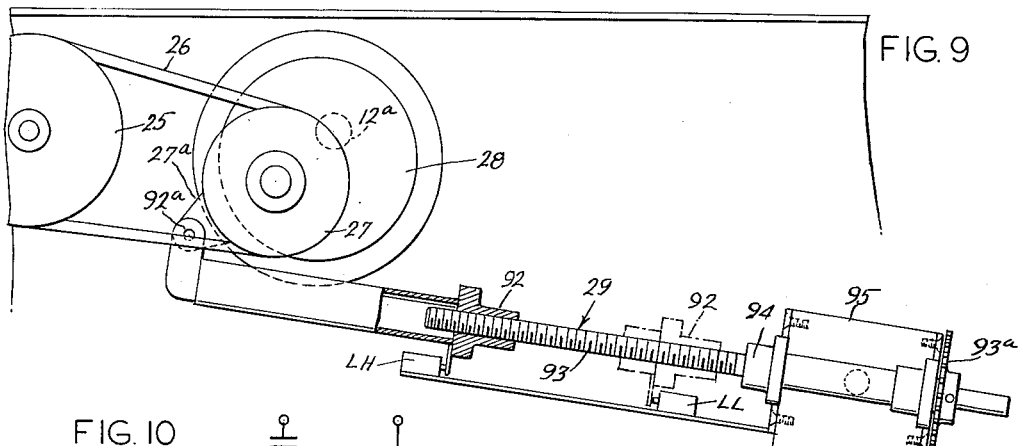
FIG. 9 is an enlarged view of parts shown in FIG. 4.

The adjusting device 29 (FIG. 9) which is employed for adjusting the amount of material supplied to the material measuring device, specifically the speed adjusting device for regulating the speed of the spike apron 12 which supplies fiber stock to the scale pan doors 17, comprises a link of adjustable length which includes a threaded sleeve 92 connected by a pivot pin 92a to the arm 27a which supports the pulley 27. It also includes a threaded screw shaft 93 screwed into the sleeve 92, the screw shaft being turnably mounted in an anchor bearing 94 secured to a fixed mounting 95. A sprocket 93a fast on the screw shaft 93 is turned by a chain 96 from the sprocket 97 of a speed adjusting servo motor M2 mounted on the side of the machine. The servo motor M2 may be operated by air, electricity or other desired power means.

The servo motor M2 is reversibly driven in response to the action of contacts FR-1 of a forward running relay coil FR or to the action of contacts RR-1 of a reverse running relay RR. The speed adjusting range is limited by stop limit switches arranged adjacent a movable adjusting link part, there being a high speed limit switch LH where the link 29 is longest and a low speed limit switch LL where the link 29 is shortest. Under normal operating conditions it is unlikely that the limit switches will be operated but they are provided for safety. For further assurance, a second limit switch LH-1 is provided to light an alarm signal lamp SL at the upper speed limit adjustment.

In order to stop adjustment on the reverse (high speed) drive side in case the timing cam switch 70 should for some reason fail to function in time, there is provided a time delay relay TDR having a normally closed contact TDR-1 ahead of the reverse drive relay RR to stop the reverse drive in case of malfunctioning.

Figure 10:
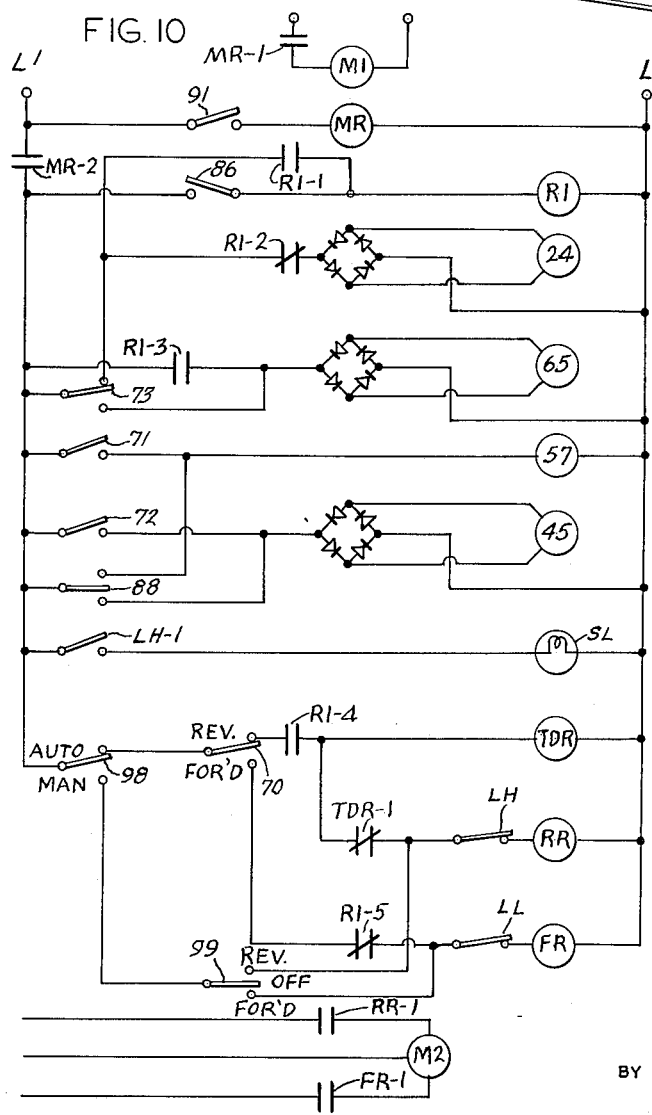
FIG. 10 is a wiring diagram.
Figure 11:
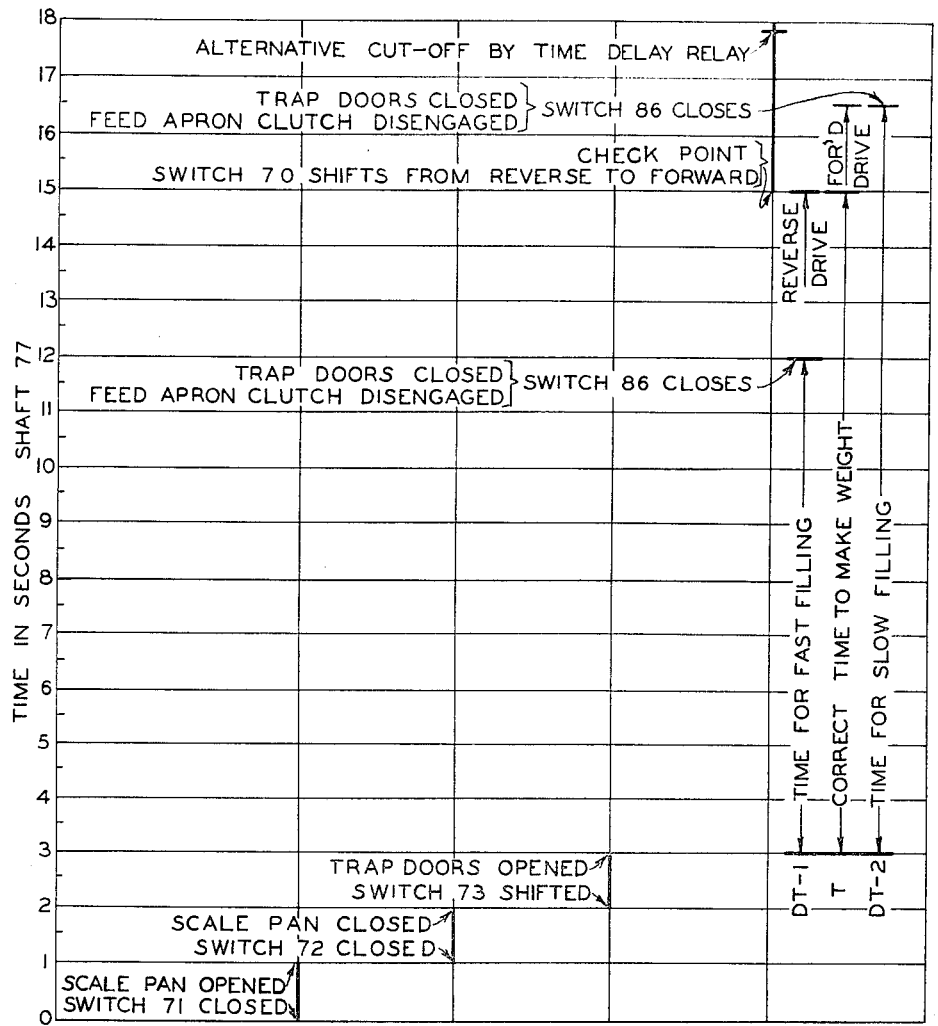
FIG. 11 is an operational or time cycle diagram.

In operation, referring to the wiring diagram, FIG. 10, and the operational diagram, FIG. 11, the motor M1 is started by closing a start switch 91. This energizes a motor starter relay MR which closes its contact switch MR-1 to start the motor M1. It also closes its switch contact MR-2 to connect the power line L1 to the control circuit. Line L2 remains connected. Motor M which drives the cam shaft 77 will be assumed to be running continuously at constant speed.

Cam switch 73 is normally engaged with its upper contact but at the rest position shortly after the end of a cycle it engages its lower contact to energize the solenoid 65 to close and hold closed the trap doors 15.

Shortly after the start of a cycle the switch 73 will be shifted to its upper contact to allow the trap doors 15 to open and to cause the spike apron drive clutch 24 to be engaged. Material is now deposited on the scale pan trap doors 17 which at this time are held closed by the latch rod 50.

When a predetermined amount of material has been deposited on the scale pan doors 17, the full-load scale beam-operated switch 86 will be closed. This will energize the coil of a control relay R1 which locks itself in on its switch R1-1 and the upper contact of switch 73 (now closed); opens its switch R1-2 to de-energize the spike apron drive clutch 24; and closes its switch R1-3 to energize the solenoid 65 and close the trap doors 15 so no more material will fall down on the scale pan doors.

Energization of control relay R1 closes its normally open switch R1-4 to the reverse drive side of the speed change motor M2. Cam switch 70 is normally in engagement with its upper contact and is shifted down a predetermined time before the end of the cycle when the scale pan is to be dumped. The point where switch 70 shifts position may be called the check point. Say the full cycle from dump to dump is 18 seconds, the check point may be set at some shorter time, say 15 seconds.

Under certain conditions the scale may be loaded rapidly so that it is full and has operated its switch 86 with the ensuing closure of relay switch R1-4 before the check point time is reached. When this is the case the reverse relay RR is energized and the motor M2 is operated in reverse to slow down the speed of the spike apron. The action ceases when the switch 70 shifts to its lower position at the check point.

If, on the other hand, the scale has not received its full load at the check point, the relay R1 will not have been energized (by the closing of full load switch 86) and its normally closed contact switch R1-5 will be found in closed position. When this is the case, forward relay RF will be energized to close its switch RF-1 of motor M2 to drive it in a forward direction to speed up the spike apron. When the load is attained and the scale switch 86 closed and R1-5 opened the adjusting motor will be stopped.

At the end of a cycle the cam switch 71 is closed to energize solenoid 57 and raise latch 50 to release the scale pan doors and allow them to fall by gravity to dump the load or charge of material. This opens scale switch 86 and leaves control relay R1 held in only on its lock-in switch R1-1.

Shortly thereafter the cam switch 72 is closed to energize the solenoid 45 to close the scale pan doors, the doors being held closed by the latch 50 and the switch 72 opening again shortly thereafter.

Then cam switch 73 is shifted briefly to its lower contact position to de-energize the relay R1 and thereby ready the clutch 24 for re-engagement (by the re-closing of R1–2); to briefly hold the solenoid 65 energized to keep the trap doors 15 closed; and allow the trap doors 15 to open and engage the clutch 24 when the switch 73 moves back to its upper contact.

Referring to FIG. 11, the fixed period of time from the point where the trap doors 15 open (cam switch 73 shifts back to its upper contact) and the check point established by the shifting of switch 70 is referred to as T, that is the standard time allowed for charging the scale pan to the proper weight. The variable time at which the scale pan may be charged before the check point is reached is referred to as DT1 ("D" for delta or differential variable time). And the variable halt point at which the scale pan may be charged after the check poit is reached is referred to as DT2. The running time in reverse for reducing the speed of loading is T–DT1; and the running time in forward for increasing the speed of loading is DT2–T.

A manual switch 88 is provided for selectively unlatching the scale pan doors 15 by energizing unlatching solenoid 57 or for closing the scale pan doors by energizing the solenoid 45.

A switch 98 is provided for selecting between automatic and manual operation of the speed changing motor M2. And a manual switch 99 is provided for selecting for forward or reverse operation of the motor M2.

At each cycle or turn of the camshaft 77 there will be some adjustment of the speed, if needed, until the correct feed rate is attained. If there is not enough adjustment in one cycle there will be further adjustment in the ensuing cycle or cycles until he predetermined correct rate is attained, that is when DT1, DT2 and T are all equal. In case the shaft 77, i.e., the automatic timer, should stop during the time T, the time delay relay TDR will halt the speed-increasing action by de-energizing the reverse relay RR.

The same result can also be obtained, that is, the adjustment of the feed rate to the scale pan by the feed conveyor, by the use of the time cycle cams and tripping switch as described to:

(a) Start and stop an auxiliary feeding device such as a tandem feed or overhead conveyor;

(b) Start, stop or control speed of bottom (hopper) apron;

(c) Start, stop or control speed of extension hopper apron;

(d) Change distance between hopper comb or beater and spike apron, by moving either or both.

It is thus seen that the invention provides an improved and effective batch feeding apparatus which is especially useful for feeding textile fiber stock.

While one embodiment of the invention has been described for purposes of illustration it is to be understood that there may be various embodiments and modifications within the general scope of the invention.

I claim:

1. Material handling apparatus, comprising in combination, material feed means, a batch measuring device arranged to receive material from said material feed means, said batch measuring device including signal means for providing a signal when a predetermined amount of material has been received thereby from said material feed means, delivery means for delivering material from said measuring device, a constantly operating timing device, means operated by said timing device for operating said delivery means at the end of a predetermined time period, checking means operated by said timing device at a time less than the full predetermined time period, and selectively reversibly operable adjusting means controlled conjointly by said checking means and said signal means prior to the action of said delivery means for retainably adjusting the rate of feed of material to said batch measuring device selectively slower or faster in accordance with the relative time of action of said signal means and said checking means.

2. Apparatus as set forth in claim 1, further characterized by the fact that said adjusting means operates to reduce the rate of feed if said signal means has produced a signal before said checking means acts and operates to increase the rate of feed if said signal means has not produced a signal before said checking means acts.

3. Apparatus as set forth in claim 2, further characterized by the fact that said adjusting means has its feed decreasing action halted when said checking means acts and has its feed increasing action halted when said signal means produces a signal after the checking means acts, the feed increasing action being halted at the time said delivery means acts if it has not been halted theretofore by said signal means.

4. Material handling apparatus, comprising in combination, material feed means, a weighing device arranged to receive material from said material feed means, said weighing device including signal means for providing a signal when a batch of material of a predetermined weight has been received thereby from said material feed means, a constantly operating timing device which includes a first timing element which establishes a predetermined time cycle and a second timing element which provides a check signal at a check point within said time cycle, feed control means for decreasing or increasing the rate of feed to said weighing device, and means responsive to a signal of said full weight signal means which decreases the rate of feed to said weighing device up to the point where said second timing element acts if a full-weight batch has been fed to the weighing device theretofore, and means responsive to said second timing element action at the check point which increases the rate of feed to said weighing device up to the point where said full weight signal means acts if a full-weight batch has not been fed to the weighing device at the time the second timing element acts, the feed increasing action being halted at the time said first timing element acts at the end of a cycle if it has not been halted theretofore by said full-weight signal means.

5. Material handling apparatus as set forth in claim 4, further characterized by the fact that said feed control means retains its setting from one cycle to another in its adjusted condition.

6. Material handling apparatus as set forth in claim 4, which further includes a time delay control which stops operation of said feed control means at a predetermined time after said second or check timing element acts if said first or cycle timing device does not act to stop the action of said feed control means before said predetermined time.

7. Material handling apparatus as set forth in claim 4, which further includes means for stopping the operation of said material feed means when said full-weight signal means gives a signal of full weight on said weighing device.

8. Material handling apparatus as set forth in claim 4, which further includes means for stopping the operation of said material feed means when said full-weight signal means gives a signal of full weight on said weighing device, means for starting the operation of said material feed means after said first or cycle timing element acts at the end of a cycle, and means for emptying material from said weighing device when said first timing element acts at the end of a cycle.

9. Material handling apparatus, comprising in combination, a weighing scale having a material holding and dumping door, a full-weight signal means, a dumping door closing means, a latch for holding the door closed, and a latch release means;

a feed conveyor for supplying material to said weighing scale, and power control means for starting and stopping said feed conveyor;

a trap door above the scale door, and trap door closing means for said trap door, the trap door opening by gravity when said trap door closing means is deenergized;

and timing means including a first or full cycle signal means, a second or check signal means giving a signal near the completion of a full cycle, a third or scale door closing signal means, and a fourth or trap door and power control signal means, means for adjusting the speed of said feed conveyor; including a servo motor with controls for operating it selectively in forward or reverse direction to increase or decrease the speed of said feed conveyor, travel limit means to stop the action of said servo motor at the ends of its adjusting movement, and a time delay device to stop said servo motor after a predetermined running time in one direction if not stopped earlier by other means;

said first or full cycle signal means being connected to said latch release means to open the scale door at the end of a cycle;

said full-weight signal means being connected to close said trap door and stop said feed conveyor;

said full-weight signal means starting the weight-decreasing action when it acts before said second or check signal means acts and the check signal means stopping it, said second or check signal means starting the weight-increasing action when it acts before said full-weight means acts and the full-weight means stopping it, if it acts before said first or full cycle signal means acts;

said fourth signal means being connected to stop said feed conveyor and close the trap door at the end of a cycle when said scale door is open and to open the trap door and start the feed conveyor when the scale door is closed after the start of a cycle;

and said third signal means being connected to close the scale door after it has been opened, the latch holding it closed.

10. In apparatus of the class described whose purpose is to deliver an individual batch of fibrous material of substantially the same prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor element which is operative to receive fibrous material from a bin and deliver it to the scale pan, and variable-speed drive means for the conveyor element which stops automatically in response to the tipping of the scale beam, in combination, means operative, if the speed of the conveyor, while running be less than a predetermined optimum speed, automatically to increase the speed of the conveyor element by a small increment, cycle-after-cycle, until said predetermined optimum speed is attained.

11. In apparatus of the class described whose purpose is to deliver an individual batch of fibrous material of substantially the same prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor element which is operative to receive fibrous material from a bin and deliver it to the scale pan, and variable-speed drive means for the conveyor element which stops automatically in response to the tipping of the scale beam, in combination, means operative, if the speed of the conveyor, while running, be greater than a predetermined optimum speed, automatically to decrease the speed of the conveyor element by a small decrement, cycle-after cycle, until said predetermined optimum speed is attained.

12. Apparatus of the class described whose purpose is to deliver an individual batch of fibrous material of substantially equal prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, and a conveyor which is operative to receive fibrous material from a bin and deliver it to the scale pan, and variable-speed drive means for the conveyor which stops automatically in response to the tipping of the scale beam, and wherein the means for dumping the scale pan comprises a continuously rotating shaft which turns at constant speed, characterized in having automatic means, including a rotary control element, which turns in exact time with said continuously rotating shaft, operative to adjust the linear speed of the conveyor to that predetermined optimum speed at which the pan will dump approximately the same weight of material during each cycle regardless of the rate at which the material is supplied to the conveyor.

13. In a machine whose purpose is to deliver an individual batch of fibrous material of substantially equal prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor operative to receive fibrous material from a bin and deliver is to the scale pan, and variable-speed drive means for the conveyor which stops automatically in response to the tipping of the scale beam, in combination, means for varying the speed of the conveyor including a control element which revolves at constant speed and which makes one complete revolution during each weighing cycle, means defining a control portion of the arc of travel of said control element during which the scale beam should normally tip, and means whereby, if the scale pan receive material sufficient to tip the scale beam before the control element reaches the beginning of said control portion, the speed of the conveyor driving means is decreased.

14. In a machine designed to deliver a batch of fibrous material of substantially equal prescribed weight during each of successive weighing cycles and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor operative to receive fibrous material from a bin and deliver it to the scale pan, and variable-speed drive means for the conveyor which stops automatically in response to the tipping of the scale beam, in combination, means for varying the speed of the conveyor including a control element which revolves at constant speed and which makes one complete revolution during each weighing cycle, means defining a control portion of the arc of travel of said control element during which the scale beam should normally tip, and means whereby, if the scale pan has received insufficient material to tip the scale beam when the control element passes the terminus of said control portion, the speed of the drive means for the conveyor will be increased.

15. In a machine designed to deliver a batch of fibrous material of substantially equal prescribed weight during each of successive weighing cycles and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor operative to receive fibrous material from a bin and deliver it to the scale pan, and variable-speed drive means for the conveyor which stops automatically in response to the tipping of the scale beam, in combination, means for varying the speed of the conveyor including a control element which revolves at constant speed and which makes one complete revolution during each weighing cycle, means defining a control portion of the arc of travel of said control element during which the scale beam should normally tip, means whereby, if the scale beam receives material sufficient to tip the scale beam before the control element reaches the beginning of said control portion, the speed of the conveyor drive means will be decreased, and means whereby, if the scale pan has received insufficient material to tip the scale beam when the control element passes the terminus of said control portion, the means for driving the conveyor will be increased.

16. A machine according to claim 8, wherein the means for increasing or decreasing the speed of the conveyor is operative progressively to increase or decrease the speed, cycle-after-cycle, by a fractional portion of the entire available speed range.

17. Apparatus according to claim 8, wherein the terminus of the control portion of the weighing cycle is located within the last quadrant of said cycle thereby permitting the delivery of material into the scale pan during a major portion of the weighing cycle.

18. Apparatus according to claim 8, further characterized in having manually actuatable means whereby the speed of the conveyor driving means may be varied at will independently of the automatic means for controlling its speed.

19. Material handling apparatus, comprising in combination, material feed means, a batch measuring device arranged to receive material from said material feed means, said batch measuring device including signal means for providing a signal when a predetermined amount of material has been received thereby from said material feed means, delivery means for delivering material from said measuring device, a constantly operating timing device, means operated by said timing device for operating said delivery means at the end of a predetermined time period, checking means operated in time with said timing device to provide a signal at a time less than the full predetermined time period, and means operative, if the amount of feed at the time said checking means provides a signal during a cycle, between deliveries, is different from a predetermined optimum amount of feed, automatically to change the amount of feed, up or down, by an increment, cycle-after-cycle, as may be required, until said predetermined optimum amount of feed is attained.

20. Apparatus as set forth in claim 19, in which said means for changing the amount of feed during a cycle comprises means for changing the rate of feed.

21. Apparatus as set forth in claim 19, in which said material feed means comprises a feed device which operates continuously from the time said batch measuring device is ready to receive material until the predetermined amount of material has been received by said measuring device, and in which said means for changing the amount of feed during a cycle comprises means for changing the speed of operation of said feed device.

22. Apparatus as set forth in claim 21, in which said feed device comprises an endless conveyor which supplies material to said batch measuring device.

23. Material handling apparatus, comprising in combination, material feed means, a batch measuring device arranged to receive material from said material feed means, said batch measuring device including signal means for providing a signal when a predetermined amount of material has been received thereby from said material feed means, delivery means for delivering material from said measuring device, a constantly operating timing device, means operated by said timing device for operating said delivery means at the end of a predetermined time period, and means operative, if the amount of feed within a predetermined time period less than a full cycle period during a cycle between deliveries is less than the optimum amount of feed, automatically to increase the amount of feed by an increment, cycle-after-cycle, as may be required, until said predetermined optimum amount of feed is attained.

24. Material handling apparatus, comprising in combination, material feed means, a batch measuring device arranged to receive material from said material feed means, said batch measuring device including signal means for providing a signal when a predetermined amount of material has been received thereby from said material feed means, delivery means for delivering material from said measuring device, a constantly operating time device, means operated by said timing device for operating said delivery means at the end of a predetermined time period, and means operative, if the predetermined amount of feed during a cycle between delivery is attained within a predetermined time period, less than a full cycle period, automatically to decrease the amount of feed by increment, cycle-after-cycle, as may be required, until said predetermined optimum amount of feed is attained within said predetermined time period, less than a full cycle period.

References Cited by the Examiner

UNITED STATES PATENTS

| 2,933,281 | 4/60 | Hyde | 222—59 X |
| 2,983,325 | 5/61 | Moody | 222—63 X |

LOUIS J. DEMBO, *Primary Examiner.*